United States Patent [19]
Lambert et al.

[11] Patent Number: 5,466,778
[45] Date of Patent: Nov. 14, 1995

[54] PROCESS FOR POLYMERIZATION OF TETRAHYDROFURAN USING ACIDIC ZEOLITE CATALYSTS

[75] Inventors: Timothy L. Lambert; John F. Knifton, both of Austin, Tex.

[73] Assignee: Huntsman Corporation, Salt Lake City, Utah

[21] Appl. No.: 138,026

[22] Filed: Oct. 19, 1993

[51] Int. Cl.$^6$ ................................................ C08G 63/66
[52] U.S. Cl. .................................................... 528/361
[58] Field of Search .............................. 526/216; 528/361

[56] References Cited

U.S. PATENT DOCUMENTS 5,262,562  11/1993  Hollingsworth et al. ............... 560/240

Primary Examiner—Joseph L. Schofer
Assistant Examiner—Wu C. Cheng
Attorney, Agent, or Firm—Russell R. Stolle; Ron D. Brown

[57] ABSTRACT

Disclosed is an improved process for polymerization of tetrahydrofuran to prepare poly(tetrahydrofuran) products with a MW range of 200 to 5000 and a dispersity of <2, which comprises premixing a carboxylic anhydride, such as, for example acetic anhydride and a dealuminated Y-zeolite and subsequently adding tetrahydrofuran at a temperature below 100° C., wherein the order of addition of reactants is critical and the yield is improved by premixing the acetic anhydride and zeolite and then adding tetrahydrofuran.

1 Claim, 2 Drawing Sheets

PROCESS FOR POLYMERIZATION OF TETRAHYDROFURAN USING ACIDIC ZEOLITE CATALYSTS

FIELD OF THE INVENTION

This invention concerns a process for the polymerization of tetrahydrofuran and, more particularly, this invention concerns an improved process for polymerization of tetrahydrofuran (THF) which comprises premixing a zeolite catalyst and acetic anhydride and subsequently adding tetrahydrofuran at a temperature of less than 80° C. The yield of polymer was increased by a factor of >73X by conducting the polymerization in the presence of a dealuminized Y-zeolite premixed with acetic anhydride. In continuous polymerization of THF, poly(tetrahydrofuran) products with narrow MW distributions, i.e., dispersities of less than two, have been obtained.

BACKGROUND OF THE INVENTION

It is known in the art to prepare polytetramethylene ether glycols by polymerizing tetrahydrofuran in the presence of a cationic initiator, generally of the Lewis acid type.

An article by Dreyfus and Dreyfus, "Advances in Polymer Science," 4 528 (1967) reviews the types of catalyst which have , , previously been used. They include:

(1) Metal halide adducts with active hydrogen containing compounds, e.g. $FeCl_3$ or $AlCl_3$ with α-chloro-dimethyl ether or benzyl chloride.

(2) Unsaturated tertiary oxonium salts. In these salts, the anion is usually derived from a Lewis acid, e.g., $BF_4^-$, $SbCl_6^-$.

(3) Other materials including complex inorganic acids such as $HClO_4$, $HBF_4$, $HSO_3F$, $H_2SnCl_6$; acylium salts from Lewis acids and acylating agents; aluminum alkyls and haloalkyls such as $AlEt_3$, $AlEt_2Cl$, $AlEtCl_2$ with a cocatalyst such as water or epichlorohydrin.

Many of the catalysts used to the present have given only liquid polymers and conversions have varied widely.

Cationic initiators which have been important commercially include strong, soluble acids such as fuming sulfuric acid and fluorosulfonic acid. Although the poly(tetrahydrofuran) diols produced using the soluble acid initiators have a sufficiently narrow molecular weight distribution ($M_w/M_n$ less than about 2-3) for many applications, these processes generate large amounts of acidic wastes that require costly treatment and disposal. Another disadvantage is that product consistency is difficult to achieve.

U.S. Pat. No. 4,189,566, to Mueller et al. (1980), discloses a process for the preparation of polybutylene glycol carboxylic acid diesters by polymerizing tetrahydrofuran, where the tetrahydrofuran is treated before polymerization with a strong mineral acid and is polymerized in the presence of one or more carboxylic acids and/or anhydrides.

U.S. Pat. No. 4,243,799 (1981), to Mueller et al. provides a description of a process for the preparation of polybutylene glycol carboxylic acid diesters by polymerizing tetrahydrofuran, wherein the tetrahydrofuran after removal of the catalyst used in the preparation of tetrahydrofuran, is treated, before polymerization, with a strong mineral acid, an organic sulfonic acid, silica gel and/or bleaching earth, the treating agent is removed from the tetrahydrofuran and the tetrahydrofuran is then polymerized in the presence of one or more carboxylic anhydrides and a polymerization catalyst. The improvement comprises using as the polymerization catalyst a bleaching earth containing less than 3% by weight of water, said catalyst being arranged in a fixed bed, and passing a mixture of pretreated tetrahydrofuran and carboxylic anhydride through said fixed bed. Acetic anhydride is used in some examples, but it is mixed with the tetrahydrofuran.

The use of a "bleaching earth" catalyst avoids many of the problems of the soluble acid catalysts (see, for example, U.S. Pat. Nos. 3,433,829 and 4,189,566 and 4,243,799 supra). The bleaching earths known in the art include naturally occurring aluminum hydrosilicates and aluminum/magnesium hydrosilicates of the montmorillonite type. The clays are normally activated by acid washing. A carboxylic acid anhydride is used as an activator, and the resulting polytetramethylene ether polymer has ester end groups. The ester end groups can be converted to hydroxyl end groups by base-catalyzed transesterification with an alcohol (see U.S. Pat. No. 4,230,892) or by catalytic hydrogenation.

In U.S. Pat. No. 4,728,722, to Mueller et al. (1988) there is disclosed a process for the batchwise preparation of polyoxybutylene polyoxyalkylene glycols by copolymerizing tetrahydrofuran with a 1,2-alkylene oxide in the presence of compounds containing reactive hydrogen, the polymerization being carried out over a bleaching earth catalyst or zeolite catalyst.

It is stated that the improvement comprises feeding the 1,2-alkylene oxide to the reaction mixture in such a manner that the concentration of the 1,2-alkylene oxide in the reaction mixture is kept below 2%.

In U.S. Pat. No. 5,208,385, to Kahn et al. (1993), there is described a process for producing tetrahydrofuran polymers having a narrow molecular weight distribution which comprises polymerizing tetrahydrofuran in the presence of a carboxylic acid anhydride and an effective amount of an amorphous silica-alumina catalyst, wherein the amorphous silica-alumina catalyst has an $Al_2O_3$ content with the range of about 10 wt % to about 30 wt % and wherein the resulting tetrahydrofuran polymer has a number average molecular weight within the range of about 200 to about 5000, and a molecular weight distribution less than about 3.

A significant disadvantage of the bleaching earth catalysts is that the polymers produced have higher polydispersities ($M_w/M_n$) than desirable, typically 3–4 at molecular weights of about 400 to 3000. It is well-known in the art that the molecular weight distribution (MWD) of the poly(tetrahydrofuran) impacts the properties of the polyurethanes or polyesters made therefrom. In general, mechanical properties of finished products are superior when poly(tetrahydrofuran) having a relatively narrow molecular weight distribution is used (see U.S. Pat. No. 4,933,503, Col. 2).

There are two general approaches to obtaining poly(tetrahydrofuran) having a relatively narrow molecular weight distribution. In one approach, poly(tetrahydrofuran) having a broad MWD is prepared, and the product is post-treated either by distillation to separate low molecular weight oligomers, selective depolymerization (see, for example, U.S. Pat. No. 4,363,924), selective solvent extraction with water/alcohol/hydrocarbon systems (see U.S. Pat. No. 4,762,951), or a combination of these techniques (see U.S. Pat. No. 4,933,503). All of these post-polymerization techniques are expensive, labor-intensive, and time consuming. The object of the second general approach is to eliminate the need for posttreatment by preparing poly(tetrahydrofuran) having a narrow MWD. In one method, a low concentration of an alkylene oxide must be maintained throughout the tetrahydrofuran polymerization (U.S. Pat. No. 4,728,722 supra). In another method, the mole ratio of the reactants and reaction temperature must be carefully controlled (U.S. Pat.

No. 4,510,333).

U.S. Pat. No. 4,303,782, to McHale et al. (1981), discloses a method of polymerizing cyclic ethers especially tetrahydrofuran to form high molecular weight polymers using a zeolitic polymerization catalyst. The zeolite catalyst preferably has a Constraint Index from 1 to 12 and a silica:alumina ratio of at least 12. The method described is directed toward making a high molecular weight solid polymer. In addition, the yields appear to be low, ranging from 4–13%.

In the art relating to polymerization of tetrahydrofuran there is a need for a catalyst with the advantages of bleaching earth catalysts, but which gives polymers having a narrower molecular weight distribution and which, therefore, overcomes the need for posttreatment. If yield of narrow range molecular weight poly(tetrahydrofuran) were also greatly improved with a new catalyst it would constitute a major contribution to the art. If such a catalyst reduced acidic wastes, it would be substantially more promising commercially.

In addition, a process which possessed all of these advantages and which could be operated in a continuous fashion, rather than batchwise, would represent a process with great commercial potential, the equivalent of which would not appear to be known or currently available.

SUMMARY OF THE INVENTION

In accordance with the foregoing the instant invention provides an improved process for polymerization of tetrahydrofuran which comprises premixing a zeolite and acetic anhydride and subsequently adding tetrahydrofuran at a temperature of less than about 80° C. and a pressure range of zero to 300 psig.

The yield of polymer is increased from about 4%–13% basis weight in the prior art to about 59%–73% basis weight by conducting the batchwise polymerization in the presence of about 13 wt % acetic anhydride and a dealuminized Y-zeolite.

DETAILED DESCRIPTION OF THE INVENTION

Figure 1:
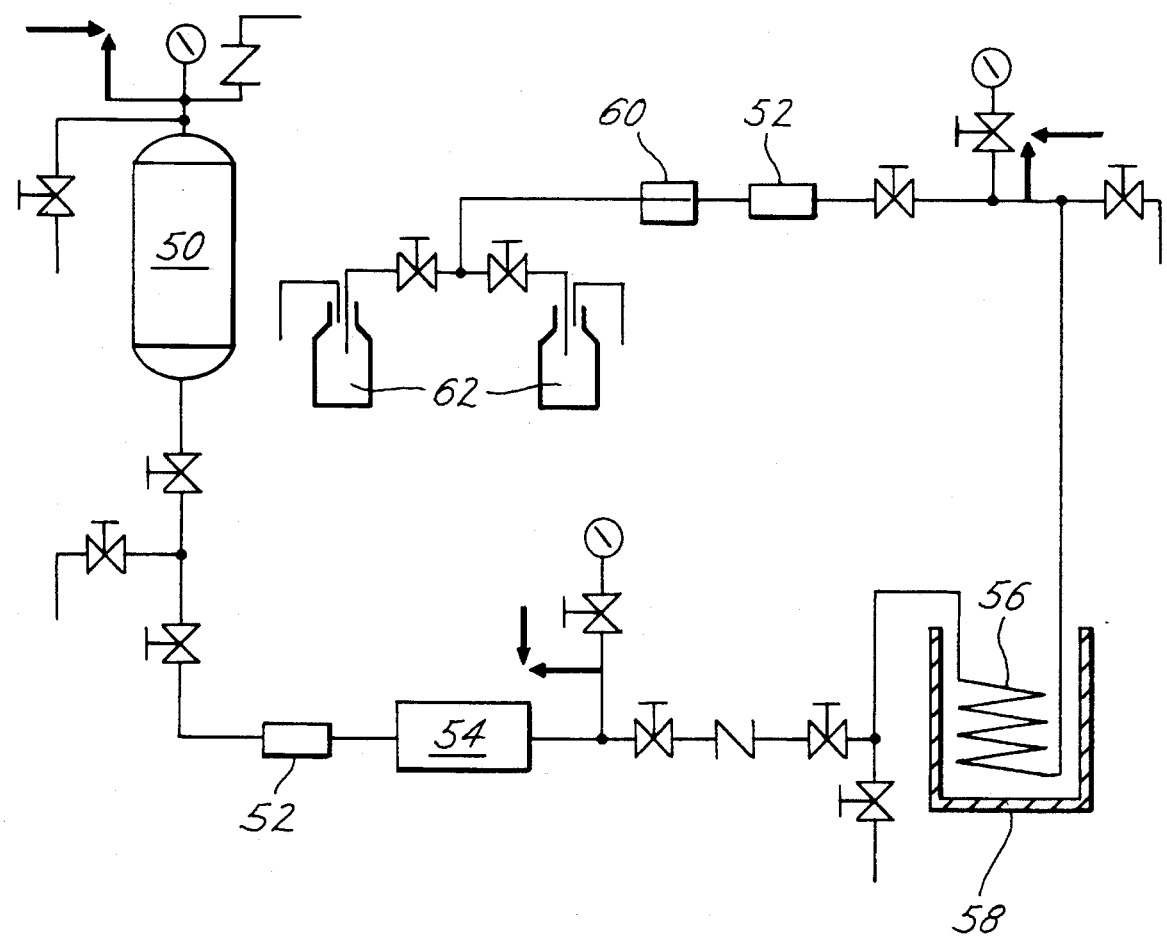
FIG. 1 represents a reactor system for the continuous polymerization of tetrahydrofuran using the catalyst of the instant invention. "The reactor system includes feed tank 50, filters 52, pump 54, tubular reactor 56, chiller 58, back pressure regulator 60, and collecting vessels 62."

In the process of the invention, a tetrahydrofuran polymer having a relatively narrow molecular weight distribution is produced by batch or continuous polymerization of tetrahydrofuran, and optionally other monomers, in the presence of a dealuminized-Y-zeolite which has been premixed with acetic anhydride.

Any grade of tetrahydrofuran can be used in the process of the invention. Optionally, one or more additional cationically polymerizable monomers can also be included. Suitable copolymerizable monomers include epoxides such as ethylene oxide and propylene oxide, oxetanes, substituted oxolanes such as 3-methyltetrahydrofuran, and the like, and mixtures thereof. Preferred comonomers are ethylene oxide and propylene oxide.

A carboxylic acid anhydride is premixed with the catalyst. Suitable carboxylic acid anhydrides include acetic anhydride, propionic anhydride, phthalic anhydride, maleic anhydride, succinic anhydride and the like. Acetic anhydride is preferred.

The order of addition of reactants was found to be critical in the batchwise polymerization and the yield is improved by premixing the acetic anhydride and zeolite and then adding tetrahydrofuran to the mixture, compared with adding the zeolite to a tetrahydrofuran/acetic anhydride mixture.

The amount of carboxylic acid anhydride used is not critical, but the ratio of tetrahydrofuran to anhydride affects the molecular weight of the polymer obtained. Generally, it is preferred that the mole ratio of tetrahydrofuran to carboxylic acid anhydride be within the range of about 1 to about 50. A more preferred range is from about 10 to about 30. In general, the higher the mole ratio of tetrahydrofuran to anhydride, the higher the molecular weight of the resulting polymer.

The catalysts useful in the invention are dealuminated Y-zeolites.

Although zeolites have been used to polymerize tetrahydrofuran, as for example, in U.S. Pat. No. 4,303,782 and CA95(8):63008r, the yields are low, ranging from 4%–13% basis weight. In the instant invention the yield of the polymer has been increased to 59%–73% basis weight by conducting the polymerization in the presence of 13 wt % acetic anhydride. The yield is increased by a factor of >73X. The yield in the absence of acetic anhydride was <1% basis weight using the same zeolites.

The zeolites demonstrating the best results were acidic dealuminated Y-zeolites. There are a number of methods known in the art for dealuminating zeolites. A reference which provides an informative overview of the various processes is "Catalytic Materials: Relationship Between Structure And Reactivity" Ed Whyte, T. E. et al., Ch. 10, American Chemical Society, Washington, D.C., 1984. (Based on the 1983 State-of-the-Art Symposium sponsored by the Division of Industrial and Engineering Chemistry, San Francisco, Calif., Jun. 13–16, 1983.)

Each method of dealumination results in a framework modified to a different extent. The resulting zeolite can be not only dealuminized, but in some cases structurally rearranged.

Only zeolites that have been dealuminized would produce a zeolite catalyst which provides the desired results in tetrahydrofuran polymerization. The methods of dealumination which provide the preferred structure in the resulting framework are produced by:

a) Ammonium exchange, followed by calcination;

b) Chelation of alumina by treatment with EDTA, or other amine or carboxylic acid functionalized chelating agent;

c) Treatment of the zeolite with fluorine or a fluorine-containing reactant; and d) Hydrothermal and/or acid treatment.

The preferred zeolite catalysts for the generation of poly(tetrahydrofuran) products have been found to be medium pore, dealuminated faujasite Y-Zeolites, in their acidic form. Far less effective are large pore zeolites, such as the beta zeolites, and Y-zeolites in their sodium form.

The unit cells of faujasite zeolites are cubic, $a_o \approx 2.5$ nm, and each contains 192 silicon- or aluminum-centered oxygen tetrahedra which are linked through shared oxygen atoms. Because of the net negative charge on each of the aluminum-centered tetrahedra, each unit cell contains an equivalent number of charge-balancing cations. These are exclusively sodium ions in zeolites in their synthesized form. Typical cell contents for the Y-zeolites in the hydrated form are:

Y-zeolites are distinguished on the basis of the relative concentration of silicon and aluminum atoms and the consequent effects on detailed structure and related chemical and physical properties. The aluminum atoms in the unit cell of Y-zeolite vary from 76 to 48, resulting in a Si:Al ratio between 1.5 and 3.0. Both the cation concentration and charge density on the aluminosilicate structure are lower for Y-zeolites than for X-zeolites, where the aluminum atoms in the unit cell vary from 96 to 77.

The feature which determines the difference between faujasites and other zeolites built up from sodalite units is the double 6-membered ring or hexagonal prism, by which the units are linked. The sodalite unit, or β-cage, can be represented by a truncated octahedron, with the 24 silicon or aluminum atoms (designated T atoms) taking positions at the vertices. The 36 oxygen atoms are displaced from the midpoints of the edges joining the vertices in order to attain tetrahedral configuration around the T atoms. The free diameter of the void within the β-cage is 0.66 nm, but only the smallest molecules can enter through the 0.22 nm diameter opening in the distorted ring of six oxygen atoms associated with each hexagonal face. Each sodalite unit is linked tetrahedrally across hexagonal faces by six bridging oxygens to four other sodalite units. The larger void spaces enclosed by sodalite units and hexagonal prisms are termed α-cages, or supercages. The α-cage is a 26-hedron with a free diameter of ≈1.3 nm, and it can be entered through four distorted 12-member rings of diameter 0.80–0.90 nm. In this way each α-cage is tetrahedrally joined to four others giving a complex system of void space extending throughout the zeolite structure. The α- and β-cages together give Y-zeolites, along with X-zeolites, the largest void volume of any known zeolites, which is ca. 50 vol % of the dehydrated crystal. From the catalytic viewpoint, the α-cages are by far the most important, since, unlike the β-cages, they permit entry of numerous aliphatic and aromatic compounds.

It has been demonstrated in the instant invention that acidic, dealuminized Y-zeolites are particularly effective for THF polymerization. Acidity can be introduced into a zeolite in four ways:

a) Ion-exchange with ammonium ion, followed by thermal decomposition.

b) Hydrolysis of ion-exchanged polyvalent cations, followed by partial dehydration.

c) Direct proton exchange.

d) Reduction of exchanged metal ions to a lower valence state.

These methods of zeolite treatment are discussed in more detail by J. M. Thomas and C. R. Theocharis, in "Modern Synthetic Methods" Vol. 5, p 249 (1989), R. Schefford edit. Said acidic, dealuminized Y-zeolites should then in the application of this invention for making poly(THF) products have a silica-to alumina molar ratio of greater than three, preferably a ratio of 5 or greater and most preferably a silica-to-alumina ratio of 5 to 100. The examples demonstrate the usefulness of catalyst having a silica-to-alumina ratio of 5 to 75.

Examples of suitable commercially-available, dealuminized Y-zeolites include UOP's LZY-82 and LZY-72, PQ corporation's CP-304-37 and CP-316-26, UOP's Y-85, Y-84, LZ-10 and LZ-210. The examples demonstrate the particular effectiveness of CP-316-26. The unit cell size and $SiO_2/Al_2O_3$ molar ratio for these dealuminated Y-zeolites are noted in the following table:

TABLE 1

| ZEOLITE TYPE | UNIT CELL SIZE, A | $SiO_2Al_2O_3$ MOLAR |
|---|---|---|
| LZY-82 | 24.53 | 7.8 |
| LZY-84 | 24.51 | 8.4 |
| LZY-85 | 24.49 | 9.1 |
| LZY-10 | 24.32 | 23.7 |
| LZY-20 | 24.35 | 18.9 |
| LZ-210 | 24.47 | 9.9 |
| LZY-72 | 24.52 | 8.1 |
| CP316-26 | 24.26 | 45.7 |
| CP304.37 | 24.37 | 11.0 |

The examples demonstrate the particular effectiveness of CP316-26, having a silica-to-alumina molar ratio of 45.7.

The poly(tetrahydrofuran) products from the process of the invention have molecular weights which make them useful in the preparation of polyesters, polyurethanes and polyureas. Typically the molecular weights obtained will be within the range of about 200 to 5000. Preferable the peak MW of poly (tetrahydrofuran) products should be in the range of 400 to 4000 and the dispersity of said products should be less than 2.5, most preferably less than two (<2.0).

The process of the invention can be performed at any desired temperature below 80° C. Especially suitable is a temperature range from about −10 to 60° C. A more preferred range is 0 to about 20° C.

The process of the invention can be performed at a pressure less than, greater than or equal to atmospheric pressure, although it is typically most convenient to perform the process at atmospheric pressure to 300 psi.

The process of the invention can be performed batchwise or continuously. Although most of the related processes of the art are performed batchwise, continuous polymerizations have been demonstrated using the catalyst of the instant invention. It has been demonstrated in the continuous runs, that polymers of a more uniform molecular weight distribution (lower dispersity), comparable to commercially available materials, could be reproducibly prepared.

Tables 2 and 3 show the results of several experiments conducted using acidic zeolite catalysts. It should be noted that:

1) With a dealuminized Y-zeolite in acidic form (CP 316-26) as catalyst and acetic anhydride as co-catalyst, an excellent poly(tetrahydrofuran) product is obtained that has a peak MW of 3872 and a MW dispersity of 2.15 (see Ex. 3).

2) By comparison, using a large pore zeolite, such as a Beta zeolite (Valfor C861β), yields either a poly(THF) product with a bimodal distribution (Ex. 1), or a polymer with a wide dispersity ($M_w/M_n$=4.6, see Ex. 4) that involves possessing a substantial quantity of low molecular weight product.

3) In the absence of acetic anhydride cocatalyst, no polymerization occurs (cf. Ex. 1 and 2).

4) Y-zeolites in their sodium form do not catalyze THF polymerization, even in the presence of acetic anhydride cocatalyst (ex 5).

5) The order of addition of reagents plays a key role in these polymerizations. Polymer of Ex. 6 (Dispersity 1.84) was prepared by premixing the Valfor CP316-26 zeolite catalyst and acetic anhydride cocatalyst for 5 minutes followed by addition of tetrahydrofuran monomer. By contrast, monomer and acetic anhydride were premixed and then added to the catalyst during the preparation of Ex. 3. A more narrowly distributed polymer with ~½ the number average MW (MN) resulted from premixing the acetic anhydride and zeolite.

We conclude that the poly(THF) products of Ex. 3 and 6 would be most useful as soft segments for polyurethanes or polyesters.

ments using the equipment of FIG. 1. In this series of experiments, an adjustable rate pump was used to supply the feed over a 7 ft. ×⅜ in. tubular stainless steel reactor. The product was then collected in a glass vessel. Back pressure was set to 75 psig by the back pressure regulator. The feed was composed of 85% tetrahydrofuran, 7.5% acetic acid, and 7.5% acetic anhydride by weight. The catalyst was Valfor CP316-26, an acidic dealuminized Y-zeolite. The reactor held 37–45 g of catalyst. The tubular catalyst bed was plugged with glass wool on either end to prevent catalyst extrusion from the reactor. The temperature was held constant by submersing the reactor in a constant temperature bath.

TABLE 2

BATCHWISE ACIDIC ZEOLITE CATALYZED POLYMERIZATIONS

| Ex. No. | Zeolite Used | Amount Zeolite | [TRF], M | Acetic Anhydride | Peak MW | MW | MW | Dispersity $M_w/M_n$ |
|---|---|---|---|---|---|---|---|---|
| 1 | Valfor C861β | 10.5 g | 10.9 | 0.12 | 9772 | 8875 | 1255 | 7.07 (a) |
| 2 | Valfor C861β | 10.3 g | 12.3 | — | — | — | — | — |
| 3 | Valfor CP316-26 | 10.4 g | 10.9 | 0.12 | 3872 | 3316 | 1542 | 2.15 |
| 4 | Valfor C861β | 10.2 g | 10.9 | 0.12 | 4213 | 3930 | 856 | 4.59 (b) |
| 5 | UOP LZY 52 Na⁺ | 10.5 g | 10.9 | 0.12 | — | — | — | — |
| 6 | Valfor CP316-26 | 9.7 g | 10.9 | 0.12 | 1618 | 1392 | 755 | 1.84 |

| | Examples | Yield (%) | Routine |
|---|---|---|---|
| 1. | 1 | 59 | 5 days |
| 2. | 2 | 0 | >3 days |
| 3. | 3 | 67 | 3 days |
| 4. | 4 | — | 1 day |
| 5. | 5 | 0 | 1 day |
| 6. | 6 | 73 | 2 days |

[a]Bimodal dist w/peaks at 9772 and 570.
[b]Substantial presence of low molecular weight adducts.

All runs used a feed of 10.8 mol/l tetrahydrofuran, 0.7 mol/l acetic anhydride, and 1.1 mol/l acetic acid and Valfor CP316-26 acidic zeolite as catalyst. Ex 6–9 used the same catalyst load and a forerun was collected on Ex. 7–9 over at least 18 hours after an operating change was instituted to allow equilibrium to be established in the reaction conditions.

Ex. 6 shows the effects of start-up on the polymerization reaction. The catalyst goes through a "non-equilibrium" phase where, over time, the feed rate steadily decreases and a pressure gradient builds up across the catalyst bed. The molecular weight of the polymer produced decreases to a

TABLE 3

| Ex. No. | Notebook No. | tetrahydrofuran, (g) | Acetic Anhydride (g) | Zeolite, (g) | Zeolite Type | Yield, % basis tetrahydrofuran Weight | Notes: |
|---|---|---|---|---|---|---|---|
| 1 | 6904-63B | 126 | 20 | 10.5 | Valfor C861β | 59 | tetrahydrofuran and acetic anhydride were mixed and zeolite subsequently added |
| 3 | 6904-69A | 121.5 | 0 | 10.27 | Valfor C861β | 0 | |
| 3 | 6904-73A | 127.6 | 20.23 | 10.4 | Valfor CP316-26 | 67 | tetrahydrofuran and acetic anhydride were mixed and zeolite subsequently added |
| 6 | 6904-76A | 131 | 20.8 | 9.69 | Valfor CP316-26 | 73 | Zeolite and acetic anhydride were premixed and tetrahydrofuran subsequently added |

Figure 2:
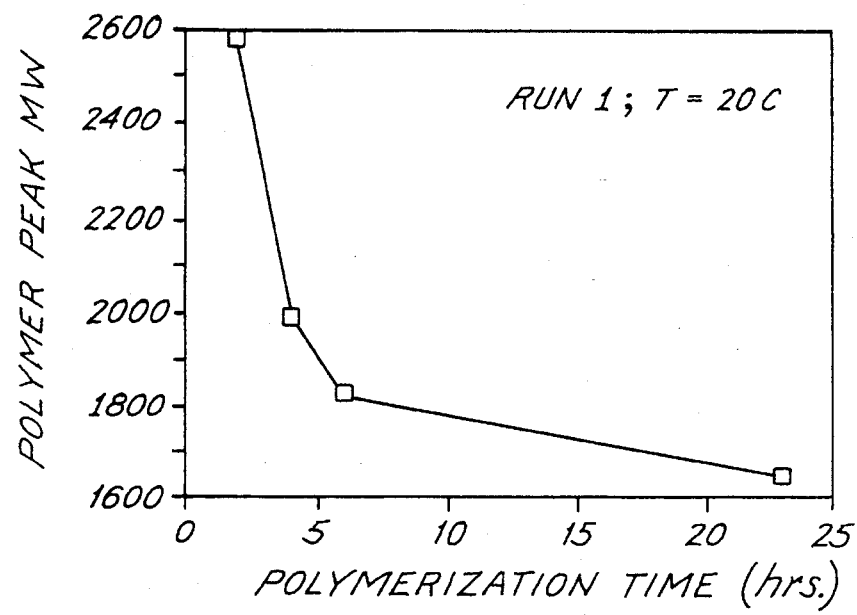
FIG. 2 is a graph demonstrating the average molecular weight vs. time for the catalyst.

Table 4 illustrates five continuous polymerization experilimiting molecular weight over time (FIG. 2). Thus the reactor must be lined out when new catalyst is added or an operating change is introduced.

Figure 3:
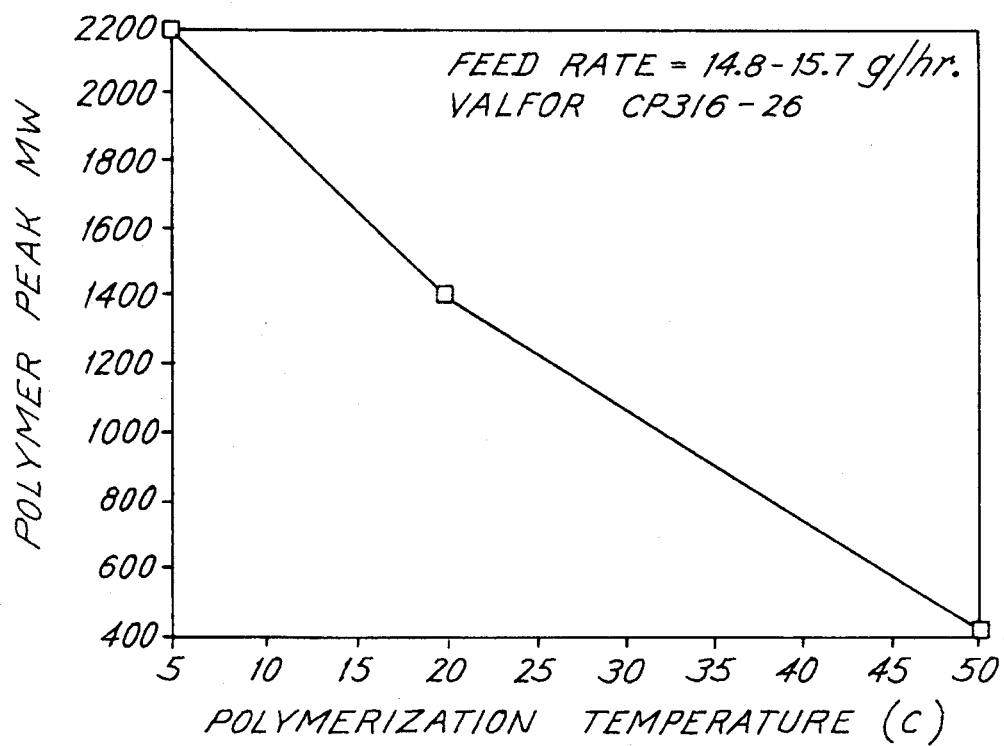
FIG. 3 demonstrates the relationship between temperature and molecular weight during continuous polymerization.

The conversion doubled when the feed rate was roughly halved at a constant temperature (Ex. 7). This is understood on the basis that the reaction is not at equilibrium at these feed rates and hence a decrease in the feed rate (increased residence time in the reactor) allows the reaction to proceed closer to equilibrium and the conversion goes up. Note that there was minimal effect on polymer molecular weight since the molecular weight is determined by the chain terminating agent concentration and not the residence time (Ex. 6 peak molecular weight=1649 dispersity 1.7; Ex. 7 peak molecular weight=1412). The effect of an increase in reaction temperature at constant feed rate is to cause a decrease in the molecular weight (FIG. 3). This occurs because of the increase of the equilibrium monomer concentration with an increased temperature. Since the molecular weight is dependent on the equilibrium monomer concentration, the molecular weight decreases with increasing polymerization temperature. Reproducibility between continuous runs was demonstrated by comparison of Ex. 9 and Ex 10. After conditioning the catalyst in Ex. 9 with a 24 hour methanol wash and 24 hour forerun, and conditioning the new catalyst in Ex. 10 by a 24 hour forerun, virtually identical polymers were prepared. Note that, with the exception of Ex. 7, narrowly distributed polymers with dispersities <2, superior to commercially available polytetrahydrofuran, were easily prepared. The polymers prepared in Ex. 9 and 10 were, in fact, more uniformly distributed than the comparable commercial product, which is weighted towards higher molecular weight material. There is every reason to believe that by altering the chain terminating agent concentration in the feed and/or the temperature, narrowly distributed polytetrahydrofurans of any reasonably desired molecular weight could be produced by the continuous process using this catalyst.

The Examples 1–10 are considered illustrative and are not intended to limit the invention in any way.

TABLE 4

Continuous Polymerizations
Feed for All Runs - 10.8M tetrahydrofuran, 0.719 AA,
1.1M HoAc Catalyst = Valfor CP316-26

| Ex. Runs | Run Time | Conversion | Peak $M_w$ | $M_n$ | $M_w$ | Dispersity $M_w/M_n$ | Feed Rate/hr |
|---|---|---|---|---|---|---|---|
| Ex. 6: 2 hour forerun discarded; T = 20° C.; Conversion 15.1 | | | | | | | |
| 6904-78 7-1 | 2 hr | 15.1% | 2585 | 1417 | 2323 | 1.6 | 32.95, 2 hr |
| 2 | 4 hr | | 1994 | 1226 | 2135 | 1.6 | 29.76, 2 hr |
| 3 | 5 hr, 50 mins | | 1824 | 1102 | 1932 | 1.7 | 29.08 |
| 4 | 22 hr, 59 mins | | 1649 | 947 | 1744 | 1.7 | 25.99 |
| Ex. 7; 18 hour forerun discarded; T = 20° C.; Conversion = 33% | | | | | | | |
| 5 | 18 hr | | 1412 | 577 | 1270 | 2.2 | 14.5 |
| 6 | 20 hr | | 1417 | 692 | 1309 | 1.9 | 14.6 |
| 7 | 22 hr, 10 mins | | 1418 | 569 | 1282 | 2.3 | 16.2 |
| 8 | 23 hr, 55 mins | | 1430 | 574 | 1292 | 2.3 | 15.2 |
| 9 | 41 hr, 45 mins | | 1494 | 576 | 1296 | 2.5 | 15.7 |
| Ex. 8; 18 hour forerun discarded; T = 50° C.; conversion = 24% | | | | | | | |
| 8-1 | 18 hr | | 430 | 339 | 526 | 1.6 | — |
| 2 | 21 hr, 35 mins | | 405 | 378 | 549 | 1.5 | 15.7 |
| Ex. 9; 24 hour MeOH wash of catalyst; 24 hr forerun; T = 5° C.; Conversion = 11% | | | | | | | |
| 9-1 | 124 hr | | 2122 | 1688 | 2593 | 1.5 | 14.8 |
| Ex. 10; New catalyst charge; 24 hour forerun; T = 5° C.; Conversion ≦ 25% | | | | | | | |
| 10-1 | 24 hr, 44 mins | | 2121 | 1422 | 2354 | 1.7 | |
| | 26 hr, 11 mins | | 2309 | 1531 | 2468 | 1.6 | 14.3 |

What is claimed is:

1. In a process for producing a tetrahydrofuran polymer, an improvement providing a substantial increase in yield and narrower molecular weight range which comprises premixing in acidic, dealuminated Y-zeolite and carboxylic anhydride and subsequently adding tetrahydrofuran, wherein the dealuminated Y-zeolite has a silica-to-alumina molar ratio of about 45.7 and a unit cell size of about 24.26Å.

* * * * *